Feb. 14, 1933.  H. S. BECKETT  1,897,228
CHUCK AND CENTERING ARBOR
Filed Oct. 23, 1931   2 Sheets-Sheet 1
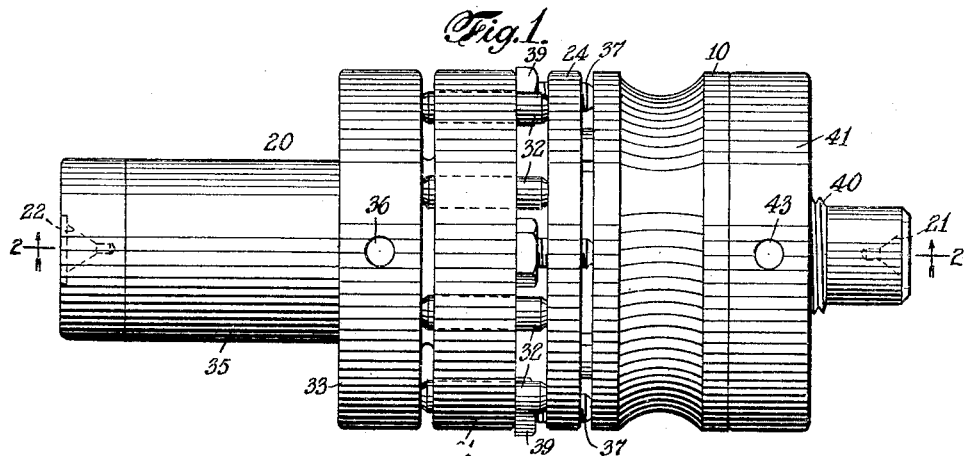
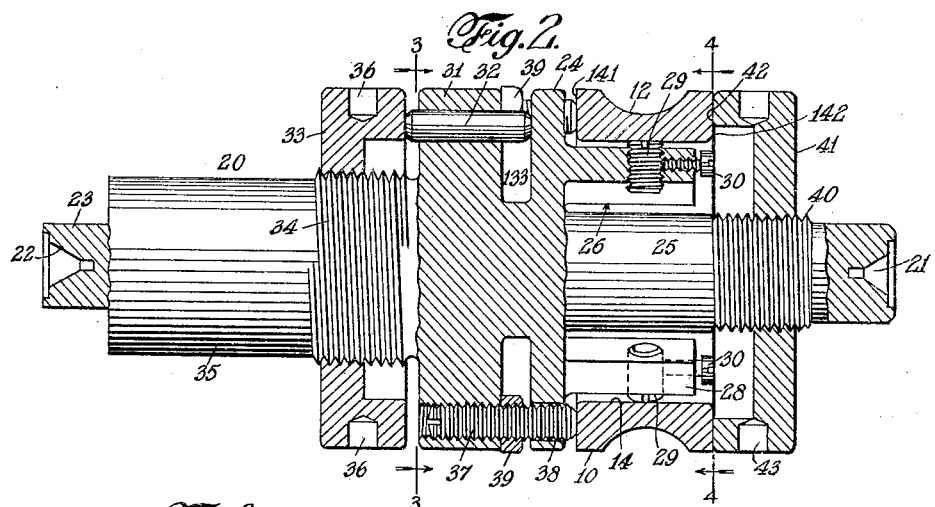
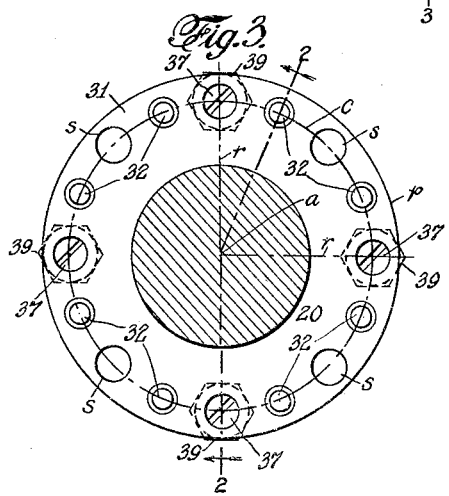
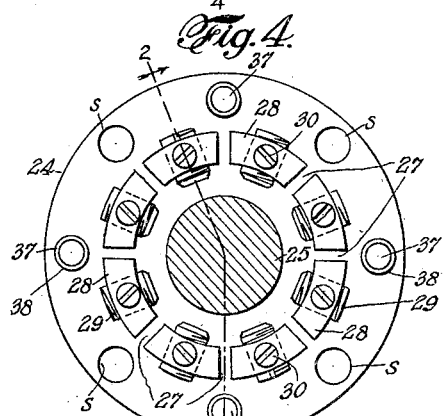
INVENTOR
HARRY S. BECKETT
ATTORNEY Feb. 14, 1933. H. S. BECKETT 1,897,228
CHUCK AND CENTERING ARBOR
Filed Oct. 23, 1931 2 Sheets-Sheet 2
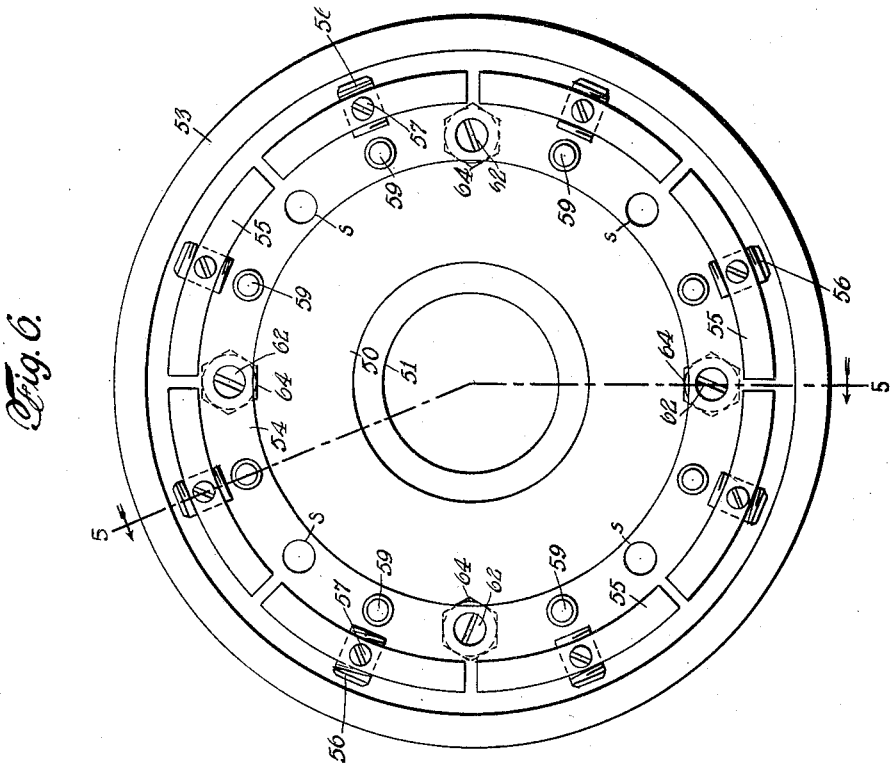
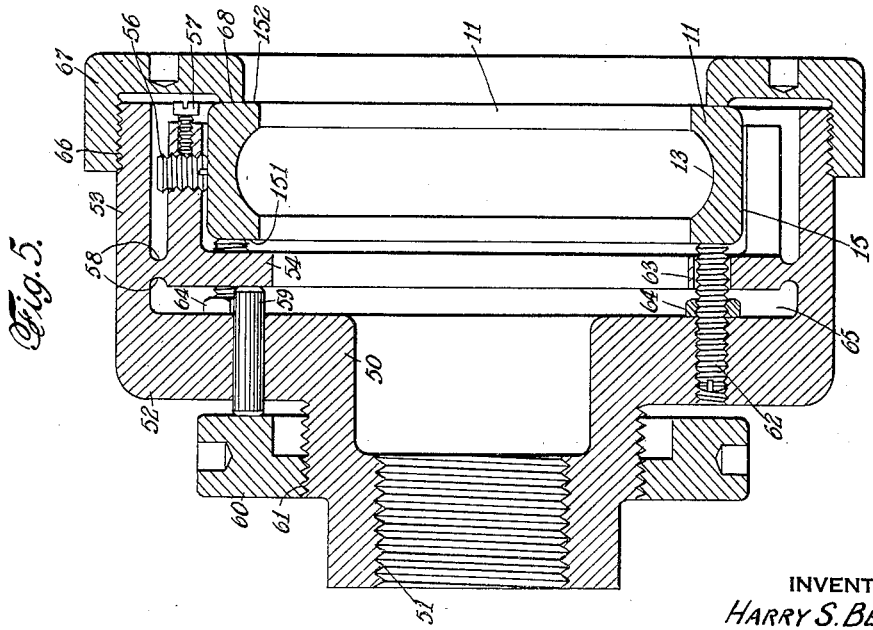
INVENTOR
HARRY S. BECKETT
BY
ATTORNEY Patented Feb. 14, 1933

1,897,228

UNITED STATES PATENT OFFICE

HARRY S. BECKETT, OF PITMAN, NEW JERSEY, ASSIGNOR TO THE HESS-BRIGHT MANUFACTURING COMPANY, OF PHILADELPHIA, PENNSYLVANIA, A CORPORATION OF DELAWARE

CHUCK AND CENTERING ARBOR

Application filed October 23, 1931. Serial No. 570,669.

The object of this invention is to furnish a centering device which may be permanently and securely related with a chuck. Another object of the invention is to provide means intimately and permanently related with a chuck for centering a work piece, particularly when it is to be ground upon one of its perimeters. When this type of grinding is to be performed the centering contacts are preferably designed to engage the other perimeter of the work piece; that is assuming the work piece to be of annular formation.

In the drawings accompanying this specification one practicable form of my invention is illustrated for chucking the rings which are to be ground on the outer perimeter and another embodiment for grinding the rings on the inner perimeter, in which drawings:

Figure 1 is an elevation of a chuck or arbor made in accordance with my invention for grinding the outer perimeter of a ball bearing inner ring, the ring being shown in a centered and chucked position.

Fig. 2 is a longitudinal section taken at about the plane of the line 2—2 in Fig. 1.

Fig. 3 is a section taken at about the plane of the line 3—3 in Fig. 2 looking in the direction of the arrows.

Fig. 4 is a section taken at about the line 4—4 of Fig. 2 looking in the direction of the arrows applied to that line; in Figs. 3 and 4 the section of Fig. 2 being indicated by the lines 2—2.

Fig. 5 is a longitudinal section illustrating a form of the invention for grinding a groove in the inner perimeter of the outer race of a ball bearing taken on a plane indicated by the line 5—5 in Fig. 6, and Fig. 6 is an end view looking at the Fig. 5 device from the right-hand side, the clamping or chucking nut having been removed and there being no work piece shown in the chuck.

My invention is primarily intended for use in centering and chucking the rings of antifriction bearings during operations upon them for forming and finishing the race ways.

The work pieces, upon which both illustrated forms of my invention are intended to work, comprise the race rings of ball bearings. Figs. 1 to 4 inclusive an inner race ring 10 is illustrated and in Figs. 5 and 6 an outer race ring 11. The grooves 12 and 13 respectively, which constitute the races or race ways for the balls of a ball bearing, not only have to be ground accurately in and of themselves, but must also be in concentric relation with the other side of the ring; that is the groove 12 must be in concentric relation with the surface 14 of the bore of the ring. In the illustration this surface 14 has the form of a hollow cylinder and the surface 15 of the ring 11 a solid cylinder.

In previous operations the surfaces 14 and 15 will have been accurately ground, also the sides 141—142 and 151—152 accurately surface ground, and the grooves 12 and 13, when the work pieces come to this arbor, formed to approximately the desired shape and approximately concentric with the opposite surface of the ring. The surfaces 14 and 15 are the contact receiving elements in centering the rings upon the arbor.

For greater ease in description I shall first describe the form of the device designed for use upon the inner ring 10 which is illustrated in Figs. 1 to 4 inclusive. The arbor, designated in a general way by the reference character 20, carries upon it the centering and chucking elements, presently to be described and is formed at its ends with the usual centers 21 and 22 and is shown flattened at 23 at one end for engaging some rotary device in the grinding machine, and also for engaging a suitable holder on the work bench used by the machine attendant.

The arbor is shown having formed integrally with it a collar or outstanding flange 24 which carries between its outer circumference and a portion 25 of the body of the arbor an internal ring 26, such ring being slotted as at 27, (see Fig. 4), for the purpose of forming a number of fingers 28. In the illustration there are shown eight of such fingers set off by the slots 27.

The collar or flange 24 has sufficient elastic yieldability so that by pressure applied to it outwardly of the fingers 28 it may be flexed and the fingers bent or moved inwardly toward the axis of the arbor body 25. For the purpose of permitting adjustment of the contacting surfaces carried by the fingers these are furnished in the form of adjustable elements illustrated as screws 29 passing through tapped holes in the fingers. There is illustrated a set screw 30 for holding each of the contacting members 29 in its adjusted position.

In initially setting up the device and also in adjusting it from time to time, the set screws 30 are backed off and the screws 29 adjusted to their approximate positions, after which the set screws are screwed down. The arbor is then placed upon the centers of the grinding machine in which it is to be used and the outer or correct position, preferably at a time when the collar or flange 24 is in its normal or un-flexed position.

For the purpose of ease of description it will be assumed that the left-hand end of the device shown in Figs. 1 and 2 is the rear of the device and that the right-hand end of the device is the front, since that is the side at which the work pieces are applied and removed. At the rear of the collar or flange 24 is a sturdy body or collar 31 which has formed in it a number of holes disposed parallel with the axis of the arbor for receiving pins 32 which are of sufficient length to traverse the space 133 between the body 31 and the collar 24 and to extend rearwardly of the body 31 for the engagement of the nut 33 which is mounted on a screw thread 34 formed on the rear end 35 of the arbor. There are shown spanner engaging holes 36.

The pins 32 are shown located outwardly of the fingers 28 and equal in number to the number of the fingers. In fact the better practice is to have a pin located outwardly radially of the center of each of the fingers so that upon screwing up the nut 33 each pin 32 will engage the flange 24 practically in the radial plane of one of the fingers and also outwardly beyond the fingers whereby during the screwing up of the nut and the flexure of the collar 24, all the fingers are moved inwardly and of course with them their contacting members so that the work piece, in the illustration the ring 10, may be readily passed over the ends of the contacting members which, upon their release by the backing off of the nut 33, will move outwardly and engage the finished perimeter 14 of the ring at a number of places and accurately center the ring in respect of the center of the arbor.

The back stops for the work piece in the illustration comprise a number of screws, in the present instance four; that is half the number of the number of pins 32, such set screws being indicated by the reference character 37 and shown mounted in tapped holes in the body 31 and passing freely through plain holes 38 in the flange 24 and spanning the space 133. Set nuts 39 are preferably mounted on the screw portions of the back stop pins 37 within the space 133.

By reference to Fig. 3 it will be seen that the centers of the back stop screw pins 37 are within the perimeter $p$ of the body portion 31 in quartering relation. They are disposed at equal radial distances $r$ from the axis $a$ of the arbor and are equal angular distances, 90°, apart.

In building devices according to my invention I have found it convenient and effective to divide the circle $c$ into sixteen equally spaced points, which include the axes of the screw pins 37. These points are thus: 22.5° apart. The centers of the eight deflected pins 32 are also disposed in this circle and at equal angular distances, 45° apart. These pins 32 are symmetrically spaced in relation to the back stop screw pins 37, each of the former being 22.5° from one of the latter. The optical effect of looking at the back end of the device with the nut 33 removed, approximately the view of Fig. 3, is that the pins 32 are paired and separated by the screw pins 37. Or that each back stop screw pin is flanked by two pins 32, these groups quartering the face of the body 31, leaving unoccupied quartering spaces between the groups.

The above unoccupied spaces, so far as space is concerned, are not objectionable, but the uneven distribution of the mass of material within the body portion 31 is objectionable for several reasons. In heat treating the device, unequal and undesirable stresses are liable to be set up within this body portion owing to this unequal distribution of mass of metal. To avoid this and other disadvantages I have found it expedient to drill holes $s$ at the point above referred to so that there will be found a practical equal distribution of the metal.

In drilling the holes $s$ these may be the same size or may be formed with the same size drill as are the holes for the back stop screw pins 37. Other advantages of having the metal removed as by the holes $s$ in the unoccupied quarter are a uniformity of speed and a contracting due to changes in temperature while the device is being used and also for assuring a balance in the structure.

The arbor at the front of the fingers 26 is shown carrying a screw thread 40 upon which is mounted a clamping or chucking nut 41 having a rearwardly directed work piece engaging flange 42. Spanner engaging holes 43 are shown formed in the ring 41.

The above described form of the device operates and is used as follows:

In Figs. 1 and 2 the work piece, the ring 10, is shown centered and chucked. The operator, upon removing the arbor 20 from the centers of the grinding machine, stands it up on its left-hand end on his bench, letting the flattened portions 23 of the end engage some holding device on his bench. He then backs off the clamping ring 41 and screws up the ring 33 for advancing the pins 32 which, by flexing the plate or flange 24 forwardly, moves the fingers 26 inwardly thereby releaving the work piece from the contacting members 29, whereupon it may be readily removed.
While the arbor is still held on the bench and the members are retracted, another work piece 10 is placed over the fingers 26 and the side face 141 permitted to rest flat against the back stop pins 37. The nut 33 is then backed away from the collar shaped body portion 31 releasing the plate or flange 24 from the pressure of the pins 32, whereupon this plate tends to assume its normal position and move the fingers 26 outwardly in this outward movement. All of the contacting members 29 engage the inner perimeter of the work piece, the surface 14 of the ring 10, and center this in relation to the center or axis of rotation of the arbor 20.
Then he screws down the clamping or chuck nut 41 causing the flange 42 to engage the end face 142 of the work piece ring and press the face 141 of such ring against the back stops 37. The arbor carrying an accurately centered and chucked ring is now ready to be mounted in the grinding machine.

In the form of my invention shown in Figs. 6 and 7 the device is in the form of a hollow chuck head having a substantially tubular portion 50 formed at the rear of its interior with a screw thread 51 adapted to be mounted on the spindle of a grinding machine. Extending outwardly from the portion 50 is a substantial and sturdy body portion 52 which carries a forwardly projecting portion 53, also substantially tubular. A flange or plate 54 which corresponds to the plate 24 illustrated in connection with the other form of my invention as the body portion 52 corresponds with the body portion 31 in such previous illustration is shown. The plate 54 carries a series of fingers 55.

These fingers are intended to contact with the outer perimeter 15 of the work piece 11 for centering this while it is ground upon its interior, in the present illustration while the race way groove 13 is being ground. The contacting elements carried by these fingers are preferably adjustable screws 56, there being a set screw 57 for tightening each of the screws 56 in its adjusted position, as in the former instance.

Owing to the great difficulty of flexing a flange on the interior hollow body over flexing one over the exterior of a solid body it has been found expedient to relieve the flange 54 at or near the region where it joins the tubular member 53, there being illustrated upon each side a circular groove 58.
The means employed in this form of the device for flexing the plate 54 is a series of pins 59 freely mounted in holes formed in the body portion 52 near its base. These pins are actuated by means of a nut 60 engaging a screw thread 61 formed upon the outer perimeter of the portion 50 of the chuck head.

Adjustable back stops 62 are carried by the body portion 52 having screw threaded engagement with it and passing through suitable openings 63 in the plate 54. Lock nuts 64 are shown mounted on the back stop pins 62 and located in the space 65 between the body 52 and the plate 54. An exterior screw thread 66 is formed at the forward end of the tubular portion 53 and upon this is mounted the body portion 67 of a clamping member, such clamping member having an inwardly directed flange portion 68 adapted, when the ring has been properly centered by the fingers hanging upon it through their contacting members 56, to engage the side face 152 of the ring and force the outside face 151 against the back stop pins 62.

The mode of using this form of my invention is practically identical with the manner of using the other form and possibly does not need a detailed explanation.

It will be apparent that the form of mechanism illustrated and described herein is adapted for one particular use of the invention, or for use on one particular product, and that various changes may be made within the scope of the claims without departing from the spirit of my invention.

Having thus described my invention what I claim and desire to secure by Letters Patent is:

1. A device of the character specified, comprising a body portion, a slightly flexible radially disposed plate having one side directed toward the body portion, a series of longitudinally disposed fingers carried by the plate at its other side, pins slidably mounted in the body portion and engaging the plate, means for projecting the pins toward and against the plate for flexing it, and back stops carried by the body portion and freely extending through the plate for engaging the side face of a work piece seated on the fingers.

2. A device of the character specified, comprising a body portion, a slightly flexible, radially disposed plate having one side directed toward the body portion, a series of longitudinally disposed fingers carried by the plate at its other side, pins slidably mounted in the body portion and engaging the plate, means for projecting the pins toward and against the plate for flexing it, back stops carried by the body portion and freely extending through the plate for engaging the side face of a work piece seated on the fingers, and means for clamping such work piece against the back stops.

3. A substantially solid arbor having a body portion, a slightly flexible, radially disposed plate having one side directed toward the body portion, a series of longitudinally disposed fingers carried by the plate at its other side, pins slidably mounted in the body portion and engaging the plate, and means for projecting the pins toward and against the plate for flexing it.

4. A substantially solid arbor having a body portion, a slightly flexible, radially disposed plate having one side directed toward the body portion, a series of longitudinally disposed fingers carried by the plate at its other side, pins slidably mounted in the body portion and engaging the plate, means for projecting the pins toward and against the plate for flexing it, and back stops carried by the body portion and freely extending through the plate for engaging the side face of a work piece seated on the fingers.

5. A substantially solid arbor having a body portion, a slightly flexible, radially disposed plate having one side directed toward the body portion, a series of longitudinally disposed fingers carried by the plate at its other side, pins slidably mounted in the body portion and engaging the plate, means for projecting the pins toward and against the plate for flexing it, back stops carried by the body portion and freely extending through the plate for engaging the side face of a work piece seated on the fingers, and means for clamping such work piece against the back stops.

6. A device of the character specified, comprising a hollow body portion, a slightly flexible, inwardly, radially disposed plate having one side directed toward the body portion, a series of longitudinally disposed fingers carried by the plate at its other side, pins slidably mounted in the body portion and engaging the plate, and means for projecting the pins toward and against the plate for flexing it.

7. A device of the character specified, comprising a hollow body portion, a slightly flexible, radially disposed plate having one side directed toward the body portion, a series of longitudinally disposed fingers carried by the plate at its other side, pins slidably mounted in the body portion and engaging the plate, means for projecting the pins toward and against the plate for flexing it, and back stops carried by the body portion and freely extending through the plate for engaging the side face of a work piece seated on the fingers.

8. A device of the character specified, comprising a hollow body portion, a slightly flexible, radially disposed plate having one side directed toward the body portion, a series of longitudinally disposed fingers carried by the plate at its other side, pins slidably mounted in the body portion and engaging the plate, means for projecting the pins toward and against the plate for flexing it, back stops carried by the body portion and freely extending through the plate for engaging the side face of a work piece seated on the fingers, and means for clamping such work piece against the back stops.

9. A device of the character specified, comprising an arbor having centers at its respective ends, a radially extended, centrally disposed body portion, a flange-like plate carried by the arbor forwardly of the body portion and spaced therefrom, a series of forwardly projecting fingers carried by such plate and constituting the work piece centering members, back stops adjustably carried by the body and freely extending through the plate for positioning the work piece longitudinally of the arbor, there being longitudinally disposed openings in the body portion, pins mounted for reciprocation in such openings and engaging the plate outwardly of the fingers, a nut mounted by a screw thread on the arbor and adapted to press the pins against the plate to flex it and depress the fingers, and a clamping nut screw threaded on the arbor and adapted to press the work piece against the back stop pins.

10. A device of the character specified, comprising an arbor having centers at its respective ends, a radially extended, centrally disposed body portion, a flange-like plate carried by the arbor forwardly of the body portion and spaced therefrom and having a fill edge, a series of forwardly projecting fingers carried by such plate inwardly of its free edge and constituting the work piece centering members, back stops adjustably carried by the body and freely extending through the plate for positioning the work piece longitudinally of the arbor, there being longitudinally disposed openings in the body portion outwardly of the finger positions, pins mounted in such openings for reciprocation and adapted to engage the plate between the respective finger positions and the said free edge, means adapted to press the pins against the plate to flex it and deflect the fingers, and means adapted to press the work piece against the back stop pins.

11. A device of the character specified, comprising an arbor having centers at its respective ends, a radially extended, centrally disposed body portion, a flange-like plate carried by the arbor forwardly of the body portion and spaced therefrom and having a fill edge, a series of forwardly projecting fingers carried by such plate inwardly of its free edge and constituting the work piece centering members, back stops adjustably carried by the body and freely extending through the plate for positioning the work piece longitudinally of the arbor, there being longitudinally disposed openings in the body portion outwardly of the finger positions, pins mounted in such openings for reciprocation and adapted to engage the plate between the respective finger positions and the said free edge, a clamping nut screw threaded on the arbor and adapted to press the pins against the plate to flex it and deflect the fingers, and a clamping nut screw threaded on the arbor and adapted to press the work piece against the back stop pins.

12. A device of the character specified, comprising a body portion adapted to be mounted on centers, and having a radially disposed face, a flange-like plate carried by the body portion adjacent to such radially disposed face, a series of fingers carried by such plate and constituting the work piece centering members, back stops adjustably carried by the body and freely extending through the plate for longitudinally positioning the work piece, there being longitudinally disposed openings in the body portion, pins mounted for reciprocation in such openings and engaging the plate outwardly of the fingers, a nut mounted by a screw thread on the arbor and adapted to press the pins against the plate to flex it and depress the fingers, and a clamping nut screw threaded on the arbor and adapted to press the work piece against the back stop pins.

13. A device of the character specified, comprising a body portion adapted to be mounted on centers, and having a radially disposed face, a flange-like plate carried by the body portion adjacent to such radially disposed face, a series of fingers carried by such plate and constituting the work piece centering members, back stops adjustably carried by the body and freely extending through the plate for longitudinally positioning the work piece, there being longitudinally disposed openings in the body portion, pins mounted for reciprocation in such openings and engaging the plate at a region near the fingers, a nut mounted by a screw thread on the arbor and adapted to press the pins against the plate to flex it and deflect the fingers, and a clamping nut screw threaded on the arbor and adapted to press the work piece against the back stop pins.

Signed at Philadelphia, Pa., this sixteenth day of October, 1931.

HARRY S. BECKETT.